April 22, 1947. A. BELCHETZ 2,419,309
SULPHUR PRODUCTION
Filed Jan. 13, 1944
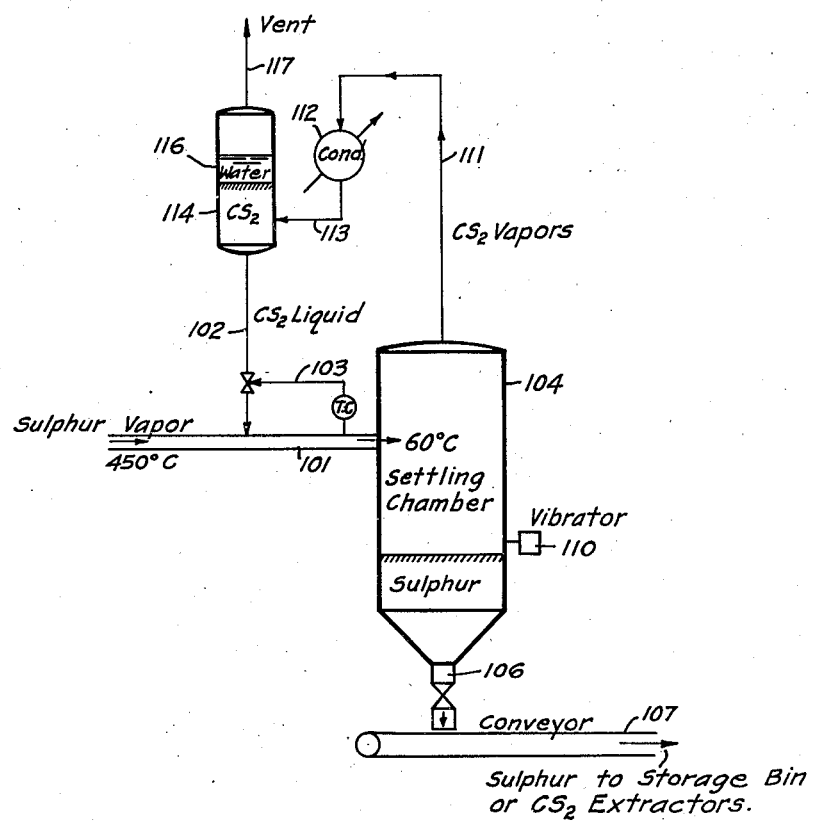
INVENTOR.
Arnold Belchetz
BY
ATTORNEY.

Patented Apr. 22, 1947

2,419,309

UNITED STATES PATENT OFFICE 2,419,309

SULPHUR PRODUCTION

Arnold Belchetz, Larchmont, N. Y., assignor to Stauffer Chemical Company, a corporation of California Application January 13, 1944, Serial No. 518,081

8 Claims. (Cl. 23—224)

This invention relates to the production of sulphur and to improvements in the methods of producing that form of sulphur which is identified as insoluble sulphur by its insolubility in carbon disulphide. Frequently, this material is referred to as sulphur mu. The invention is also concerned with production of a finely divided form of sulphur suitable for utilizatiin in place of flowers of sulphur and other fine sulphurs produced by chemical precipitation or by mechanical methods such as milling and grinding.

I have found that by quenching sulphur vapor in a suitable non-aqueous medium such as carbon disulphide, the proportion of insoluble sulphur produced can be considerably increased over that secured, for example, upon quenching sulphur vapor in ice water. The operation is carried on by ejecting a high velocity stream of sulphur in gaseous form into a non-reactive liquid which is vaporized, advantage being desirably taken of the latent heat of vaporization of the quenching medium to cool the sulphur. This enables the sulphur to be rapidly lowered in temperatures below the melting point of sulphur and below the temperatures at which rapid reversion of the soluble to the insoluble form of sulphur occurs. The product is, therefore, generally characterized by a very high insoluble sulphur content, although the process can be so operated as to produce soluble sulphur in large amounts. The product secured is of a size suitable for use in place of flowers of sulphur or other fine sulphurs.

The process of this invention has inherently numerous advantages. For example, flowers of sulphur are commonly produced by cooling sulphur vapor in large brick chambers. This is a batch operation and is consequently relatively expensive; also, the capital investment required for practice of this batch process is considerable. In addition, the product of this invention is useful in the place of those forms of sulphur now produced by chemical precipitation or by grinding and milling solidified masses; these operations are likewise costly, requiring either involved chemical reaction apparatus or utilization of heavy, expensive mills operated only with considerable power input, and requiring the presence of an inert atmosphere in the grinding-separating system. Further, the advantage of the present invention in enabling the quantity of insoluble sulphur to be increased over that produced by quenching sulphur vapors in ice water is considerable, for the process of this invention enables a sulphur to be produced which initially has such a high insoluble sulphur content that the product can be used directly, and one does not have to resort to an expensive concentration operation. However, if desired, the concentrating operation can be practiced as part of the process of this invention, thus materially simplifying the equipment and the process required.

It is the general and broad object of the present invention to provide a novel process for the production of finely divided sulphur.

A further object of the present invention is to provide an improved process for production of insoluble sulphur.

The invention includes other objects and features of advantage, some of which, together with the foregoing, will appear hereinafter wherein I have outlined the preferred manner of practicing the invention.

In the drawings accompanying and forming a part hereof, the single figure is a diagrammatic illustration of apparatus and a flow sheet which can be employed.

In that operation shown in the drawing, the quenching of the sulphur vapor is accomplished by the complete vaporization of an injected liquid medium. Sulphur vapor introduced through line 101 is mixed with liquid carbon disulphide introduced from line 102 under the control of a temperature regulating device indicated at 103. The temperature regulating device controls the quantity of carbon disulphide injected to give a mix temperature of 60° C. The mixture of materials is injected into a settling chamber 104, the mixture entering at a temperature approximating or somewhat below that temperature at which the sulphur has been found to pass very rapidly from the plastic to the solid state, namely, 60° C. In the chamber 104, the sulphur settles to the bottom and is removed through outlet 106. Any tendency of the sulphur to bridge and build if in the chamber, is offset by the action of vibrator 110 or by stirring or agitating the precipitated sulphur. Inasmuch as the boiling point of carbon disulphide is 46° C., the precipitated sulphur will contain only carbon disulphide vapor and the sulphur can, therefore, be taken away for further processing as a dry mixture by conveyor 107. This product is suitable for further processing to concentrate the insoluble sulphur content, if this is deemed necessary, or it is capable of use as such, for its insoluble sulphur content will generally be about 60% and may even be higher.

Carbon disulphide vapors are removed from the top of the chamber through line 111 into a condenser 112 wherein they are condensed and returned through line 113 adjacent the bottom of a vertical vessel 114. The carbon disulphide is sealed from the atmosphere by a water layer 116 interposed between the carbon disulphide and an atmospheric vent 117. The tank 114 is sufficiently elevated to provide adequate head to insure admission of the proper quantity of carbon disulphide through line 102 under control of the flow-regulating device 103.

In place of carbon disulphide one can use any non-aqueous medium which is non-reactive with sulphur and sulphur vapor. Thus, one can employ benzene, toulene or xylene. One can also employ petroleum hydrocarbon fractions of a suitable chemical nature so that they are not reactive with the sulphur, such as petroleum naphtha or kerosene.

I claim:

1. A process for production of sulphur comprising quenching sulphur vapor by introducing into a stream of said vapor sufficient carbon disulphide as a spray to remove from said sulphur vapor stream sufficient heat to condense substantially all of the sulphur as a finely divided solid sulphur, and recovering the sulphur.

2. A process for production of sulphur comprising quenching sulphur vapor by introducing into a stream of said vapor sufficient carbon disulphide as a spray to remove from said sulphur vapor stream sufficient heat to condense substantially all of the sulphur as a finely divided solid, said carbon disulphide carrying a small quantity of a halogen stabilizing the S mu against reversion to S lambda.

3. A process for production of sulphur comprising vaporizing sulphur continuously to provide a sulphur vapor stream, injecting as a spray into said sulphur vapor stream only sufficient carbon bisulphide to vaporize said carbon bisulphide and to cool said sulphur vapor to a temperature below about 60° C. and whereat the sulphur vapor condenses substantially completely to a finely divided solid and collecting and separating the solid sulphur from said vaporized carbon bisulphide substantially all said solid sulphur being insoluble in carbon bisulphide.

4. A process for production of sulphur comprising vaporizing sulphur continuously to provide a sulphur vapor stream, injecting as a spray into said sulphur vapor stream only sufficient carbon bisulphide to vaporize said carbon bisulphide and to cool said sulphur vapor to a temperature below about 60° C. and whereat the sulphur vapor condenses substantially completely to a finely divided solid, collecting and separating the solid sulphur from said vaporized carbon bisulphide, condensing the vaporized carbon bisulphide, and returning the condensed carbon bisulphide to contact with additional sulphur vapor substantially all said solid sulphur being insoluble in carbon bisulphide.

5. A process for producing insoluble sulphur comprising vaporizing sulphur to provide a continuous sulphur vapor stream, injecting as a spray into said sulphur vapor stream only sufficient of a non-aqueous volatile material to vaporize the material substantially completely and to cool the sulphur vapor stream to a temperature below about 60° C. so as to condense all the sulphur as a solid of which a substantial proportion is insoluble in $CS_2$, and recovering the solid sulphur substantially free of said material.

6. A process for producing insoluble sulphur comprising vaporizing sulphur to provide a continuous sulphur vapor stream, injecting as a spray into said sulphur vapor stream only sufficient carbon bisulphide to vaporize the carbon bisulphide substantially completely and to cool the sulphur vapor stream to a temperature below about 60° C. so as to condense all the sulphur as a solid of which a substantial proportion is insoluble in $CS_2$, and recovering the solid sulphur substantially free of said carbon bisulphide.

7. A process for producing insoluble sulphur comprising vaporizing sulphur to provide a continuous sulphur vapor stream, injecting as a spray into said sulphur vapor stream only sufficient of a non-aqueous volatile material to vaporize the material substantially completely and to cool the sulphur vapor stream to a temperature below about 60° C. so as to condense all the sulphur as a solid of which a substantial proportion is insoluble in $CS_2$, collecting and cooling said vaporized material and returning said cooled material for injection as aforesaid, and recovering the solid sulphur substantially free of said material.

8. A process for producing insoluble sulphur comprising vaporizing sulphur to provide a continuous sulphur vapor stream, injecting as a spray into said sulphur vapor stream only sufficient carbon bisulphide to vaporize the carbon bisulphide substantially completely and to cool the sulphur vapor stream to a temperature below about 60° C. so as to condense all the sulphur as a solid of which a substantial proportion is insoluble in $CS_2$, collecting and cooling said vaporized carbon bisulphide and returning said cooled carbon bisulphide for injection as aforesaid, and recovering the solid sulphur substantially free of said carbon bisulphide.

ARNOLD BELCHETZ.

REFERENCES CITED

The following references are of record in the file of this patent:

UNITED STATES PATENTS

| Number | Name | Date |
|---|---|---|
| 443,629 | White | Dec. 30, 1890 |

FOREIGN PATENTS

| Number | Country | Date |
|---|---|---|
| 474,191 | British | Oct. 27, 1937 |

OTHER REFERENCES

Mellor, "Inorganic and Theoretical Chemistry," vol. 10, pgs. 30–32 and 44–46, inclusive. Longmans, London, (1930). (Copy in Div. 59.)